United States Patent Office 3,513,639
Patented May 26, 1970

3,513,639
BAG FILTER CLEANING
Elroy L. Felch, Westfield, N.J., assignor to Continental Oil Company, Ponca City, Okla., a corporation of Delaware
Filed Mar. 30, 1967, Ser. No. 627,130
Int. Cl. B01d 41/00, 46/04
U.S. Cl. 55—293                               2 Claims

ABSTRACT OF THE DISCLOSURE

A bag filter medium is cleaned by subjecting it to flexure effected by moving a restriction along the length of the bag.

---

Figure 1:
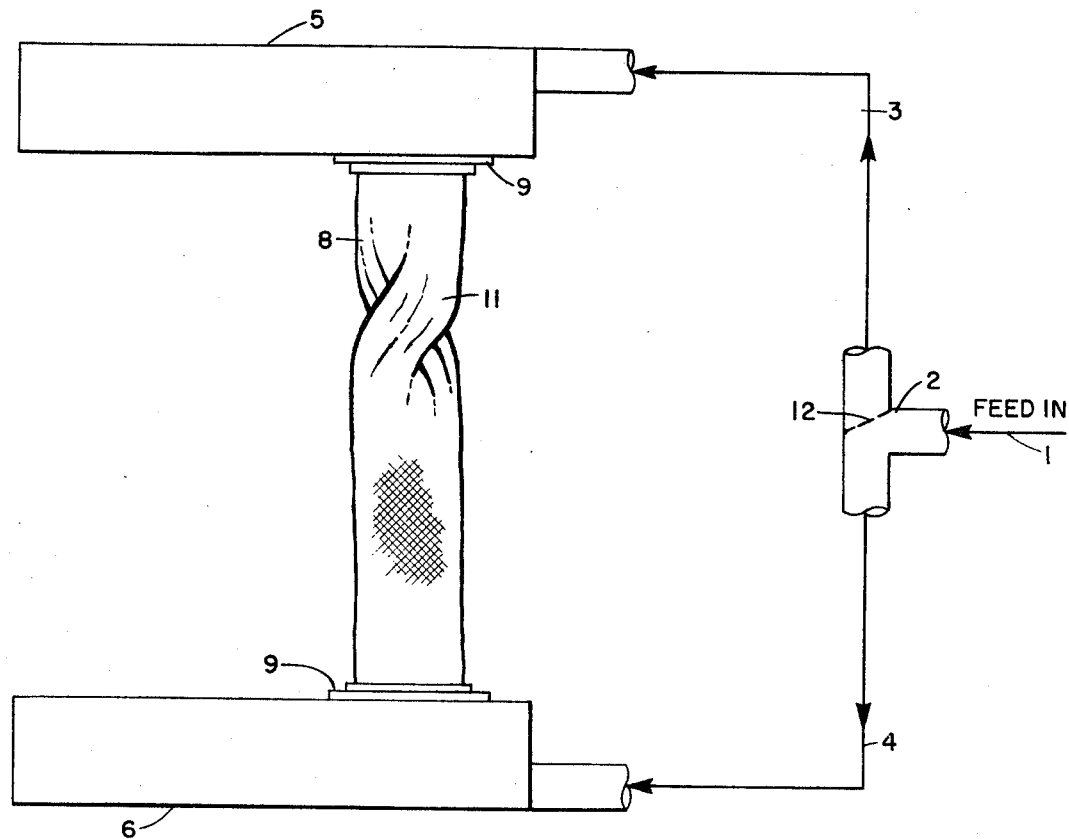

This invention relates to apparatus for cleaning flexible filter media. In one aspect, the invention relates to apparatus for cleaning an elongated tubular flexible filter medium by periodically causing a flexing restriction to traverse the length of the medium.

Bag filters are widely used in separating finely divided solids from a fluid stream. These bags generally comprise an elongated tubular cylinder of flexible material, such as cloth, connected at one or both ends to the source of fluid to be cleaned. The bag or, more typically, a plurality of such bags connected in parallel, is generally housed within an enclosure designed to collect the filtered fluid. One example of an application of such bag filters is in carbon black production, where off-gas from the process is filtered through such devices to prevent contamination of the area. Another application is in fertilizer manufacture, where product fines are removed from the process off-gas. One problem prevalent in the use of such filters is that of cleaning out the solids which accumulate inside the filter walls. After the filter has been on-stream for a certain time, the filter medium becomes blinded or plugged with accumulated solids, and must be cleaned before it can again be effective. Many devices have been proposed in the prior art to accomplish this cleaning, including various means for shaking the filter bag, such as vibrators or means for reciprocating one end of the bag, and means for striking or beating the bag, such as oscillating chains or bars. Certain of these devices require that the bag be removed from the process flow before being cleaned, and most are excessively harsh in their treatment of the bag, resulting in unduly short life of the filter medium. The devices themselves are often complex and expensive to maintain.

Accordingly, it is an object of this invention to provide apparatus for cleaning an elongated flexible filter medium simply and without the necessity of removing it from service during cleaning. Another object of the invention is to provide apparatus for cleaning an elongated flexible filter medium without subjecting it to harsh treatment. Other aspects, objects and the several advantages of this invention will become apparent upon study of this disclosure, the appended claims, and the drawing, in which The sole figure represents schematically an apparatus incorporating an embodiment of the present invention.

According to the invention, elongated flexible filters, such as are known in the art as bag filters, are cleaned of solids accumulated therein by periodically causing a flexure of the filter material to traverse the length thereof. Motive force for causing the flexure to traverse the length is in one embodiment supplied by the fluid being treated. The flexure can be in this embodiment the result of a twist incorporated in the filter medium during its installation or the result of a restricting ring surrounding the filter. In another embodiment, the motive force may be supplied by mechanical means.

The invention will now be explained in detail by referring to the drawing. Referring to the figure, a fluid containing suspended solids to be removed is introduced to the filter system by way of conduit 1. The fluid flow is then divided by such as a T 2, into two streams of approximately equal volume, 3 and 4. These two streams feed respectively into an upper inlet manifold 5 and a lower inlet manifold 6. Connected between these manifolds are one or a plurality of flexible filters, here shown as 8. These filters are normally a long cylinder of fabric, open at both ends and secured to the manifolds by suitable flange arrangements 9. Depending upon the chemical nature and temperature of the fluid being filtered, these bags vary widely in their material of construction, and can be of cotton fabric, canvas, nylon, woven plastics, etc. In most installations, a suitable discharge chamber, not shown, surrounds filters 8 and is sealed to the manifolds 5 and 6 so as to collect the cleaned gases being discharged through the filter walls; the gases are then passed to a vent or stack, or to some use in the process. Additionally, the floor of lower manifold 6 is often provided with a clean-out door or conveyor belt, not shown, for removing solids from the manifold which drop down from the inner walls of the filters. The drawing as thus far described is representative of many prior-art bag filter installations.

According to my invention, each of the filter elements is provided with a restriction in its normal cross sectional area, the restriction being moveable by fluid force along the length of the filter bag.

The restriction in the bag filter is shown in conjunction with bag 8 and comprises simply a twist 11 which is incorporated in the bag at the time of its installation between the manifolds by rotating one end of the bag, e.g. 180° from its normal relaxed condition with respect to the other end of the bag. My invention also comprises means for varying the proportion of influent fluid in conduit 1 between the two inlet conduits 3 and 4, and is shown in its simplest form in the figure as a moveable butterfly valve 12 in T 2.

In the operation according to the figure, the filter system takes a fluid containing suspended solids into conduit 1 and T 2; valve 12 is normally centered so as to pass approximately equal volumes of fluid by way of conduits 3 and 4 to manifolds 5 and 6. The fluid enters the end of filter 8, and passes out through the filter walls, leaving the suspended solids on the inner walls of the filters. The cleaned fluid is then passed to further use or disposal. When it is desired to clean the bag filters, the ratio of feed fluid passed by way of conduits 3 and 4 is simply changed, in either direction, by manipulating diverter valve 12. This causes restriction 11 to slowly move along the length of the filter bags, and the resulting flexing of the filter fabric dislodges the accumulated solids. The solids then drop into lower manifold 6, from which they can be removed as desired. Manipulation of valve 12 is reversed and repeated as desired.

Restriction 11 is preferably not of sufficient size to completely close off the cross section of the filter bag. This allows dislodged solids to drop from above the restriction to the lower manifold for removal. The ratio of desirable restricted diameter to open diameter of the filter bag will vary widely, depending upon the flexibility and the pressure of the feed fluid. Simple experimentation will determine the amount of restriction necessary to allow the influent fluid to effect movement of the restriction.

EXAMPLE

A twist of about 360° was effective on a Dacron bag filter of about 11″ diameter by 40′ long removing fertilizer fines from gas at about 5" of water pressure.

A suitable range of ratios of restricted to unrestricted diameters is from about 0.05:1 to about 0.75:1.

Although the fluid has been shown in conjunction with the figure as being proportioned by a single valve 12, it is obvious that separate and opposite-acting valves can be used in conduits 3 and 4, the objective being simply to change the balance of flows in these two conduits periodically so as to remove the restriction. The operating valve or valves can be manually operated, or can be on an automatic timer. Further, it is seen that my invention can use "dirty" fluid, i.e. it operates without shutdown on the process fluid. If desired for any reason, the process can be interrupted at cleaning time in order to introduce a separate and different motivating fluid.

The fluid being treated in a system such as this will be normally a gas, but it is obvious that my invention will also operate on a liquid stream.

I claim:
1. Filter apparatus comprising:
   (a) a flexible elongated porous filter fixedly mounted at each of its two ends;
   (b) said filter being fixedly mounted such that the material making up said filter incorporates a restriction comprising a rotational twist thereof about the longitudinal axis of said filter, said twist restriction being moveable along the length of said filter and effective to reduce the normal cross-sectional area of said filter; and
   (c) first means for passing a fluid under pressure into one of said ends of said filter effective to move said restriction away from said one of said ends.
2. The apparatus of claim 1 further provided with second means for passing a fluid under pressure into the other of said ends effective to move said restriction away from said other of said ends, and means for periodically activating said first means while deactivating said second means and vice versa.

References Cited

UNITED STATES PATENTS

| | | | |
|---|---|---|---|
| 540,785 | 6/1895 | Frost | 55—299 |
| 745,076 | 11/1903 | Schutz | 55—304 |
| 2,014,298 | 9/1935 | Schneible | 55—304 |
| 2,350,011 | 5/1944 | Black | 55—304 X |
| 3,303,636 | 2/1967 | Liel | 55—299 |
| 3,388,534 | 6/1968 | Jensen | 55—302 |

FOREIGN PATENTS

| | | |
|---|---|---|
| 359,151 | 1/1906 | France. |
| 1,007,726 | 10/1965 | Great Britain. |
| 401,186 | 8/1924 | Germany. |
| 604,096 | 10/1934 | Germany. |

HARRY B. THORNTON, Primary Examiner